United States Patent
Bittenbender et al.

(10) Patent No.: US 7,644,736 B2
(45) Date of Patent: Jan. 12, 2010

(54) PEX PIPE FOR HIGH PRESSURE AND HIGH TEMPERATURE APPLICATIONS

(75) Inventors: Jonathan Bittenbender, Berryville, VA (US); William Johansen, Sharpsburg, MD (US)

(73) Assignee: Rehau, Inc., Leesburg, VA (US)

( * ) Notice: Subject to any disclaimer, the term of this patent is extended or adjusted under 35 U.S.C. 154(b) by 0 days.

(21) Appl. No.: 11/802,169

(22) Filed: May 21, 2007

(65) Prior Publication Data

US 2007/0272319 A1    Nov. 29, 2007

Related U.S. Application Data

(60) Provisional application No. 60/808,576, filed on May 26, 2006.

(51) Int. Cl.
*F16L 11/00*    (2006.01)

(52) U.S. Cl. .................. 138/125; 138/124; 138/137; 138/140; 138/141

(58) Field of Classification Search .............. 138/125, 138/126, 132, 144, 137, 140, 141; 428/36.9, 428/36.91
See application file for complete search history.

(56) References Cited

U.S. PATENT DOCUMENTS

| | | | | |
|---|---|---|---|---|
| 3,881,521 A | * | 5/1975 | Johansen et al. | 138/126 |
| 3,988,188 A | * | 10/1976 | Johansen et al. | 156/143 |
| 4,366,746 A | * | 1/1983 | Rosecrans | 91/467 |
| 6,066,377 A | * | 5/2000 | Tonyali et al. | 428/36.3 |
| 6,422,269 B1 | * | 7/2002 | Johansson et al. | 138/137 |
| 6,656,552 B1 | * | 12/2003 | Crouse | 428/36.91 |
| 6,889,716 B2 | * | 5/2005 | Lundberg et al. | 138/130 |
| 2005/0183785 A1 | * | 8/2005 | Lundberg et al. | 138/130 |
| 2005/0199309 A1 | * | 9/2005 | Kamiyama | 138/127 |

OTHER PUBLICATIONS

International Search Report and Written Opinion, dated May 6, 2008.

* cited by examiner

*Primary Examiner*—Patrick F Brinson
(74) *Attorney, Agent, or Firm*—McGuireWoods LLP

(57) ABSTRACT

A flexible tubing having a PEX inner core is surrounded by a reinforcing structure, such as a braid. The reinforced flexible tubing meets NFPA Standards for the Installation of Sprinler Systems (13/13R/13D) in both residential and commercial buildings. The reinforced flexible tubing is suitable for a variety of other high temperature/high pressure applications. The tube's flexible characteristics facilitate its installation at a greatly reduced cost, especially in retrofitting existing structures. An adhesive can be used to improve the overall strength and stability of the reinforcing structure surrounding the PEX core. Optionally, a protective outer layer can be applied over the reinforcing structure.

25 Claims, 5 Drawing Sheets

PEX PIPE FOR HIGH PRESSURE AND HIGH TEMPERATURE APPLICATIONS

CROSS-REFERENCE TO RELATED APPLICATION

This application claims priority under 35 U.S.C. §119(e) to provisional U.S. Patent Application No. 60/808,576, filed on May 26, 2006, the disclosure of which is expressly incorporated by reference herein in its entirety.

BACKGROUND OF THE INVENTION

1. Field of the Invention

The invention relates generally to cross-linked polyethylene (PEX) pipe of the type typically used in residential and commercial applications and, more particularly, to an improved braided PEX pipe having increased burst and temperature ratings that render the braided PEX pipe particularly suited for use in high pressure/high temperature applications in the residential and commercial sectors, such as National Fire Protection Association ("NFPA") 13R fire sprinkler applications.

2. Related Art

PEX pipe is commonly manufactured from high density polyethylene ("HDPE") that experiences a change in molecular structure whereby its polymer chains are chemically linked (i.e. cross-linked) with one another to form a three-dimensional network. The most common catalysts for causing such a change in molecular structure are: a peroxide mixed with HDPE before extrusion ("Engel Method"), a silane-based cross-linking agent incorporated into HDPE resin either prior to, or during, extrusion, or a high radiation electron beam irradiated onto an extruded HDPE pipe.

Product manufactured using the Engel Method is classified as PEX-A, PEX-$X_a$, or PEX$_a$. The Engel ("peroxide") Method performs "hot cross-linking" because the cross-linking occurs during passage of melted and peroxide-infused HDPE under high pressure through a heated die. Although often more expensive than the electron irradiation and silane-based methods, the Engel Method generally provides more consistent and uniform cross-linking (85% or more) than the other methods. As a result, the Engel Method allows precise control over the degree of cross-linking. The resultant cross-link bonds are carbon-to-carbon based.

Product manufactured using the silane-based method (or "moisture cure method") is classified as PEX-B, PEX-$X_b$, or PEX$_b$. A two-step (Sioplas) or one-step (Monosil) reaction can be implemented to cross link HDPE using silane. In the Sioplas method, a silane, such as vinylsilane, for example, can be grafted upon HDPE resin prior to extrusion. In the Monosil method, a silane may be blended with the HDPE resin during extrusion. Regardless of the silane method used, cross-linking occurs in a secondary post-extrusion process that is accelerated with heat and moisture, i.e., when the resulting extruded pipe is exposed to a hot water or steam bath. Unlike the Engel or electron irradiation methods, the resultant cross-link bonds are not between carbon atoms, but are oxygen-silicon-oxygen bridges, resulting in less uniform (65% to 70%) levels of cross-linking.

Product manufactured using the electron irradiation method is classified as PEX-C, PEX-$X_c$ or PEX$_c$. The electron irradiation method is a physical process, rather than a chemical process, that achieves "cold" cross-linking. As a result, this method of cross linking can be used on already extruded HDPE pipe without any special chemical additives. The extruded HDPE pipe is routed under a high radiation electron beam, which releases hydrogen atoms from adjoining polymer chains that permits the cross-linking of the "open" carbon sites. This method yields less-uniform (70-75%) cross-linking than the Engel Method. Moreover, if the irradiation process is not properly controlled, the PEX pipe may become stiffer and discolored as a result of oxidation.

Product manufactured using one of these three processes may also include an oxygen barrier. One example is RAU-PEX $O_2$ Barrier Pipe manufactured by the assignee of this application, REHAU Inc. of Leesburg, Va., which has a co-extruded oxygen diffusion barrier that meets or exceeds industry standards.

Another example is PEX-AL-PEX pipes or PEX/Aluminum/PEX pipes that are manufactured to include a layer of aluminum between two opposing layers of PEX. The aluminum layer acts as an oxygen barrier and prevents oxygen from permeating through the PEX and corroding metal components that may be attached to the PEX pipe. A disadvantage of PEX-AL-PEX pipes, however is that repeated expansion and contraction cycles may degrade the outer PEX coating and result in corrosive galvanic contact between the aluminum and a brass compression fitting attached to the pipe.

Additionally, PEX pipe may include chlorine resistant and/or ultraviolet light resistant properties. For example RAU-PEX Non-Barrier Pipe (plumbing only) meets industry standards for chlorine resistance. Additionally, RAUPEX Red/Blue UV Shield Pipe (plumbing only) has a co-extruded polyethylene shield that provides additional protection for the pipe against ultraviolet light. Both the non-barrier pipe and the UV shield pipe are made of high quality PEX manufactured using the Engel Method (e.g., "high pressure peroxide method").

PEX pipe is predominantly used in low pressure hydronic radiant heating systems and also in low pressure residential and commercial plumbing systems and in some (low temperature/low pressure) fire protection systems. It is also used in the offshore oil sector, in natural gas applications, and in the transportation of slurries or sewage. Presently, PEX pipe has temperature and pressure ratings of approximately 160 psi at about 73.4° F., 100 psi at about 180° F., and 80 psi at 200° F., as well as a minimum burst rating as high as 475 psi at 73.4° F. (⅝ inch tube and larger). These ratings are for a minimum lifetime of 50 years under these sustained conditions, and these ratings can be tested in given pipes pursuant to the guidelines of ASTM International's Standard for Crosslinked Polyethylene (PEX) Tubing, F 876-04 (approved May 1, 2004).

PEX pipe, which is thermoset, has excellent rebound characteristics and will return to its original shape after being deformed. Accordingly, PEX pipe can withstand cracking caused by exposure to cold weather and high pressure fluids. It is also corrosion resistant. Conventional PEX pipe, however, has a low to moderate short term burst pressure that makes it unsuitable for high pressure applications such as multifamily residential fire protection system (e.g., NFPA 13/13R Fire Sprinkler Design Standards), oil field recovery applications, natural/propane gas, or high pressure compressed air systems.

NFPA 13 ("Standard for the Installation of Sprinkler Systems") is the design standard typically used for fire sprinkler installations in most commercial buildings. The standard requires water flow sufficient to support not less than four fire sprinklers, and may impose additional water flow if the property includes large places for people to gather. The standard also requires installation of fire sprinklers in attics and other unoccupied spaces.

In contrast, the NFPA 13R ("Standard for the Installation of Sprinkler Systems in Residential Occupancies up to and Including Four Stories in Height") does not require installation of fire sprinklers in unoccupied spaces and does not require a minimum flow of water to support four fire sprinklers. Thus, if the largest room can be protected with less than four sprinklers, then the water supply can be reduced to the lesser requirement, which translates to lower installation costs.

Currently, there is only one plastic pipe approved for this application, i.e., chlorinated polyvinyl chloride (CPVC), which is a rigid pipe and requires glue and solvent to make the joints. There are many issues with CPVC pipe and glue/solvent connections, including dry fitting and leaking concerns which may increase installation time and costs. CPVC is also formed of inflexible plastic, thereby increasing the costs of installation because it cannot be laid in extended lengths without joints to accommodate the structure in which it is installed. Further, CPVC's inflexibility makes it difficult to retrofit piping in older buildings or other applications where curved piping would be desirable.

Nevertheless, as discussed above, currently available PEX pipe has a short term burst pressure rating that is insufficient for use in sprinkler systems meeting the 13/13R standards, which may require short term burst ratings over 1000 psi and a long term hydrostatic strength of about 175 psi/120° F., for example. In addition to fire sprinkler systems, these higher temperature/pressure tolerances are required for a number of applications such as oil field recovery applications, natural gas, high pressure compressed air systems, and long range piping systems. Typical PEX pipe is not currently capable of achieving these higher pressure/temperature ratings. Indeed, there is no flexible, polymer piping product available in the market capable of handling the aforementioned high temperature/higher pressure applications.

Thus, there is a need for an improved, flexible PEX pipe that can be used in high pressure/high temperature applications including, but not limited to, those mentioned above, like fire sprinkler systems in commercial and high occupancy residential buildings. Moreover, there is a need for a flexible, higher pressure pipe that avoids the installation issues with rigid CPVC pipes, and can reduce installation time and costs by minimizing the amount of fittings and/or provide a more secure system minimizing the potential for leaks and water damage.

SUMMARY OF THE INVENTION

The invention satisfies the above needs and avoids the disadvantages and drawbacks of the prior art by providing a flexible PEX pipe reinforced with a braided structure, such as an outer PE jacket, sufficient to withstand the high temperature/high pressure applications described above. The invention may also use a mechanical type fitting system instead of glue and solvents to reduce installation time and costs, minimize the number of fittings required, and/or minimize the potential for leaks.

Accordingly, in one aspect of the invention, a flexible tubing for commercial and residential high pressure and high temperature applications may include an inner layer formed of PEX having a Standard Dimension Ratio value of at least about 7.0; and a reinforcing structure surrounding the inner layer. The reinforcing structure can be coupled to the inner layer without being embedded in another material, such a resin matrix.

According to another aspect of the invention, a flexible tubing may include an inner layer formed of PEX; and a reinforcing structure surrounding said inner layer. Again, the reinforcing structure can be coupled to the inner layer without being embedded in another material, but the tubing, however, has a bend radius greater than two and a half (2.5) times the outside diameter of the pipe forming a continuous bend length of not less than a ninety (90) degree angle without the need for a fitting.

In yet another aspect of the invention, there may be provided a method of making flexible tubing having a short term burst rating of at least about 1000 psi and a long term hydrostatic strength of at least about 175 psi at about 120° F. The method may comprise the steps of forming an inner, hollow core from PEX having an SDR value of at least 7.0, forming a braided reinforcing structure, and surrounding the core with the braided reinforcing structure.

Additional features, advantages, and embodiments of the invention may be set forth in the following detailed description, drawings, and claims, including methods of making or using the flexible tubing. Although numerous implementations and examples of the invention are set forth herein—including in this "Summary of Invention" section—the examples and implementations described herein are not intended to limit the scope of the invention.

BRIEF DESCRIPTION OF THE DRAWINGS

The accompanying drawings, which are included to provide a further understanding of the invention, are incorporated in and constitute a part of this specification to illustrate preferred embodiments of the invention. Together with the detailed description, the drawings serve to explain the principles of the invention. No attempt is made to show structural details of the invention in more detail than may be necessary for a fundamental understanding of the invention and the various ways in which it may be practiced. In the drawings.

DETAILED DESCRIPTION OF PREFERRED EMBODIMENTS OF THE INVENTION

Figure 1:
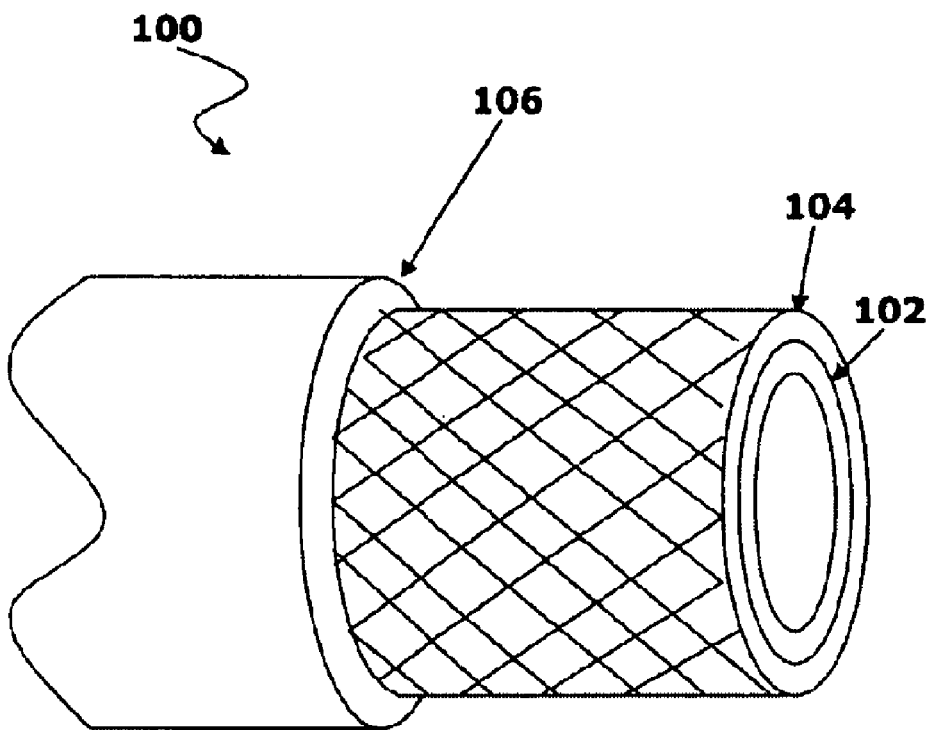
FIG. 1 is a perspective schematic view of a braided PEX pipe constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and manufacturing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals may represent similar parts throughout the several views of the drawings.

Figure 2:
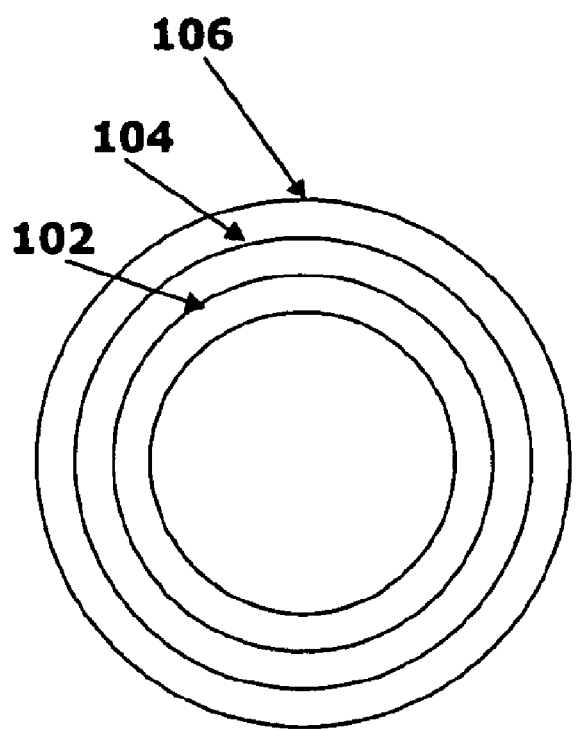
FIG. 2 is an end view of the braided PEX pipe of FIG. 1.

FIGS. 1 and 2 herein schematically illustrate various embodiments of a braided, flexible PEX pipe having increased short term burst pressure and/or increased long term hydrostatic strength.

Referring to FIGS. 1 and 2, one embodiment of a braided PEX pipe 100 of the invention includes a PEX tube 102 manufactured using one of the Engel Method ("high temperature peroxide method"), the silane-based method, or the electron irradiation method described above. Preferably, the Engel Method is used because it generally produces a PEX pipe having a higher percentage of and more uniform cross links than the other two methods. While using the Engel Method and HDPE to form PEX tube may be preferred, a person of ordinary skill in the art would recognize that the invention could be used with a variety of densities of polyethylene (PE), such as low density PE, as well as other methods available to cross-link PE.

A braid 104 is disposed about the exterior of the PEX pipe 102 to form an outer jacket. The braid 104 may uniformly or substantially uniformly contact the exterior of the PEX pipe 102, preferably without being embedded in a matrix or other material. The braid may be applied directly to the PEX pipe 102 or an adhesive optionally may be used to more securely fix the braid 104 to the PEX pipe 102, thereby improving its stability and preserving the braid's structure in relation to the pipe. The invention obviates the need to embed the braid within another material, such as a resin matrix, as shown in Japanese Patent No. JP5026379 entitled Resin Composite Tube and Resin Composite Tub Coupling, and such embedded braids do not fall within the scope of the invention.

The polyethylene ("PE") braid 104 can be attached to the PEX tube 102 by an extrusion process or by mechanically weaving strands of high-tensile strength fiber onto the PEX pipe 102. The braid 104 may be formed with the PEX pipe 102, e.g., by extrusion or similar processes, or added by a separate braiding process subsequent to the formation of the PEX pipe 102. An advantage of the Engel method is that a braided PEX pipe can be formed using an "in-line" manufacturing process whereby the PEX pipe is directly delivered from a PEX pipe extrusion die to a braiding die or weaving mechanism. Exemplary materials that may be used to form the braid 104 include, but are not limited to, nylon, fiber-reinforced nylon, vinyl, or other known braiding materials. The braiding frequency and/or thickness of the braid 104 will vary depending upon the application in which the braided PEX pipe 100 is to be used, but may include known braiding techniques, such as spiral, helical, woven/interwoven, or hoop/loop patterns such as square or single braids. The braiding should not substantially affect the overall thickness of the pipe if desired for use with mechanical fittings, such as the EVERLOC fittings described below.

Figure 3A:
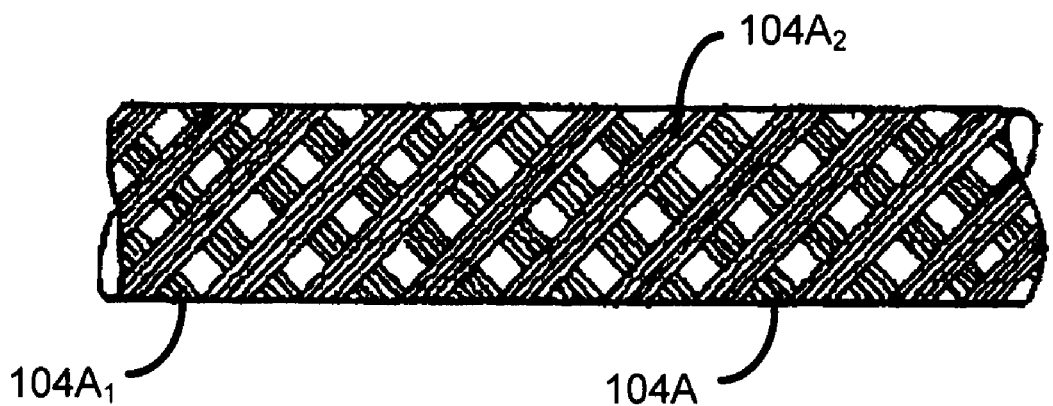
FIG. 3A is a side-elevational view of a spiral braid constructed according to the principles of the invention.
Figure 3B:
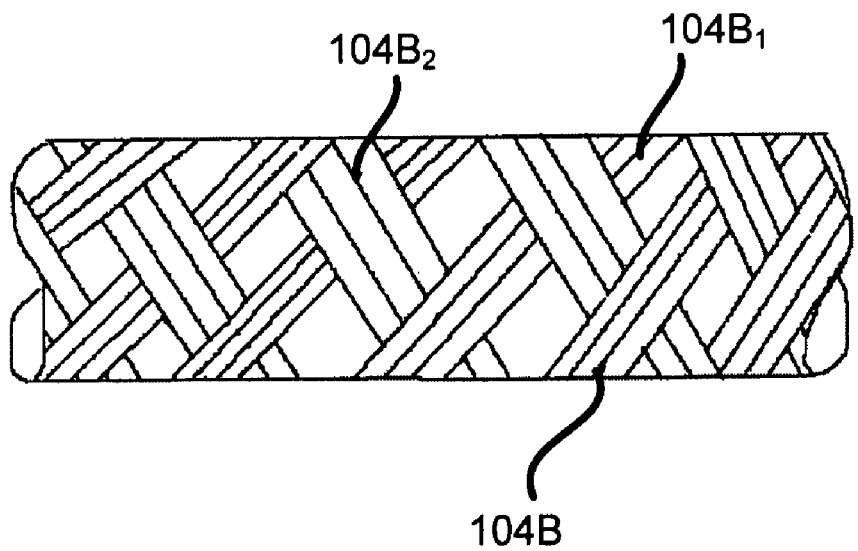
FIG. 3B is a side-elevational view of a woven braid constructed according to the principles of the invention.

FIGS. 3A and 3B illustrate examples of braiding that may be used to reinforce PEX pipe according to the principles of the invention.

FIG. 3A shows a spiral braid 104A that includes an inner wrap $104A_1$ that is wrapped around the tube 102 in a clockwise direction, and an outer wrap $104A_2$ that is wrapped around the tube in a counter-clockwise direction. The outer wrap $104A_2$ covers the inner wrap $104A_1$ where they intersect. The direction the two wraps are wrapped around the tube may be switched.

FIG. 3B is an example of a woven braid 104B. Here, a first wrap $104B_1$ and a second wrap $104B_2$ are woven around the tube 102 so that the wrap on top will alternate when the two wraps intersect. A woven braid 104B generally provides superior reinforcement than a spiral braid but adds additional complexity to the manufacturing process. The invention should not be construed as being limited to these specific types of braids, which are shown for exemplary purposes, as any type of braiding known in the art may be employed.

Figure 4:
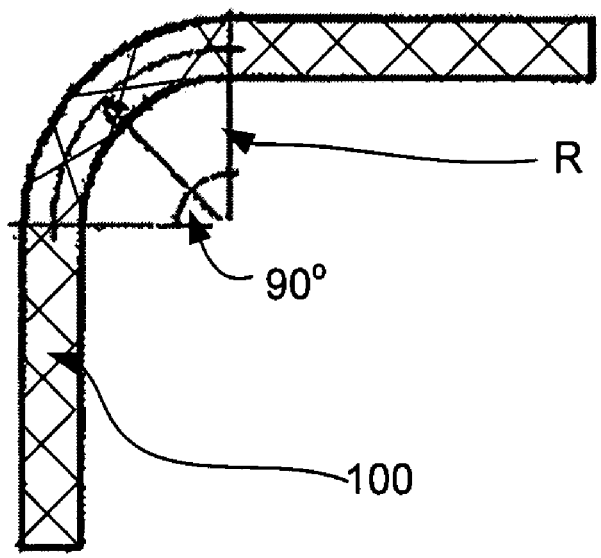
FIG. 4 illustrates a flexible pipe with a bend radius of R, constructed according to principles of the invention.

Further, adding the braid 104 to the PEX pipe enables production of a flexible pipe, i.e. having a bend radius in excess of two and a half (2.5) times the outside diameter of the pipe forming a continuous bend length of not less than a ninety (90) degree angle without the need for a fitting, adapted for high temperature/higher pressure applications without increasing the overall thickness of the pipe wall. FIG. 4 shows a braided flexible pipe 100 constructed according to principles of the invention having a bend radius of R. Thus, a high-strength PEX pipe having a Standard Dimension Ratio (SDR), which is the ratio of the outside diameter of a conduit to its wall thickness, of about 7.4 or greater can be provided in a cost-effective manner to preserve the overall flexibility of the pipe without significantly reducing its cross-sectional area and fluid flow potential. The braided PEX pipe 100 may have a bend radius that permits the pipe to be sufficiently flexible to negotiate curved passages often found in residential and commercial plumbing or oil and gas applications without requiring the cutting of the pipe and the formation of joints. A bend radius of at least about two and a half times the outside diameter of the pipe forming a continuous bend length of not less than a ninety degree angle without the need for a fitting may be preferable to provide sufficient flexibility. The braiding does not substantially affect the beneficial flexible characteristic of the underlying PEX tube.

Optionally, an outer layer 106 may be disposed about the exterior of the braid 104, as shown in FIGS. 1 and 2. The layer 106 may be extruded onto the pipe after the braid 104 is applied, and may uniformly or substantially uniformly contact the exterior of the braid 104, with or without other materials therebetween. For example, the "other materials" that may be disposed between the outer layer 106 and the braid 104 may include an adhesive material, an oxygen blocking material, an ultraviolet light resistant material, a chlorine resistant material, a friction reducing material, a fire retardant material, electrical traceability, leak detection, and/or any other material that adds and/or improves the physical properties of the braided PEX pipe 100. As noted above, however, it is preferred that is no such "other material," except for perhaps an adhesive, be used between the braid 104 and PEX pipe 102. The optional outer layer 106 may be or may include at least any of the materials described above in this paragraph. In another embodiment, the outer layer 106 may be formed with the PEX pipe 102, e.g., by extrusion or similar processes, and then covered with the braid 104. In this case, again it is preferred that the braid 104 be coupled to layer 106 without being embodied in a matrix or other material.

The braided PEX pipe 100 illustratively shown in FIGS. 1 and 2 and as described above is flexible and has increased short term burst pressures as compared to conventional PEX pipe. For example, depending on the PEX wall thickness, braiding frequency/pattern, and braiding strength or material, the braided PEX pipe's 102 short term burst pressure may be up to, or exceed, 3000 psi. Moreover, a braided PEX pipe 100 manufactured according to the principles of the invention may have double or triple the long term hydrostatic strength as compared to conventional PEX pipe. Again depending on the PEX wall thickness, braiding frequency/pattern, and braiding strength or material the braided PEX pipe 100 may have increased straightening or rigidity when installed in a substantially straight line. Additionally, various pipe color(s) or multicolors may be used depending on the color(s) of the braid 104 and/or the color(s) of the optional layer 106.

The increased short term burst pressures and increased long term hydrostatic pressures combined with the high temperature resistance of PEX pipe make the braided PEX pipe 100 suitable for use in fire protection systems compliant with NFPA Standards 13/13R. UL Standard 1821 entitled *Thermoplastic Sprinkler Pipe Fittings for Fire Protection Service* (Apr. 23, 2003), sets out the Underwriters Laboratories' standard for thermoplastic pipe used in NFPA 13 compliant fire sprinkler systems. UL 1821 requires that the pipes have a long-term (i.e. 50-year) hydrostatic strength of at least 175 psi at 120° F. or higher. UL 1821 also requires that a PEX pipe having a SDR of 9.0 withstand a hoop stress of 1175 psi.

Currently, only one plastic pipe is approved for use by NFPA 13 compliant systems, which is a rigid pipe made of CPVC and requires use of glue and solvent to make joints. Alternatively, schedule 40 black pipe is approved for NFPA 13 series systems, but this is a rigid steel pipe that also requires use of glue and solvent to make joints. The braided PEX pipe 100 of the invention not only complies with the NFPA 13 series fire protection system standards but also may be used with a mechanical fitting to make connections without the use of glue or solvents.

Figure 5:
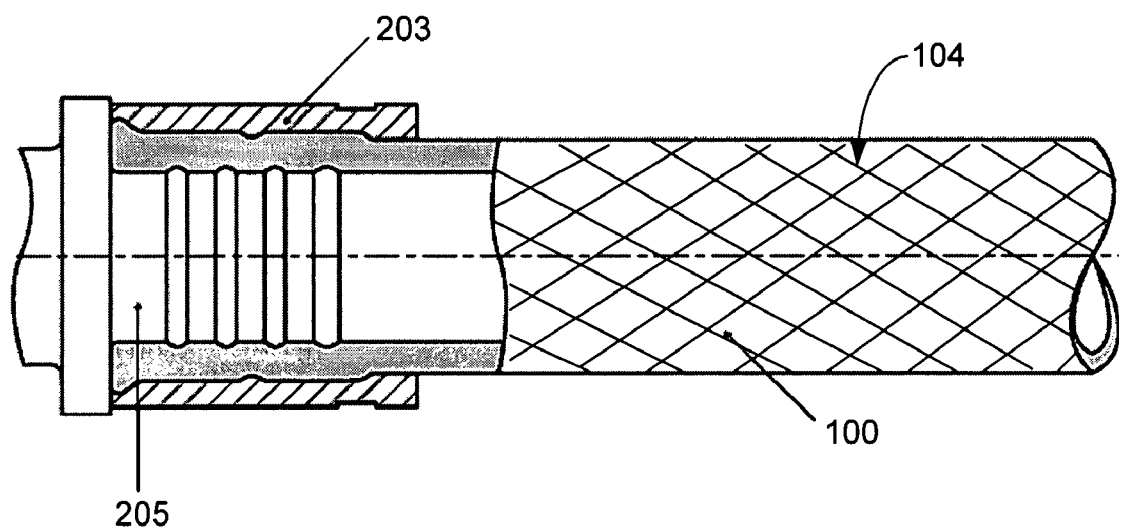
FIG. 5 is a cross-sectional view of mechanical fittings coupled to the PEX pipe of FIG. 1 according to the principles of the invention.

Use of a flexible PEX pipe of the invention also permits the use of purely mechanical fittings, thereby reducing the probability of leaks and facilitating assembly. One example of a suitable mechanical fitting is the EVERLOC® brand of brass compression fittings manufactured by Rehau, Inc., which is shown coupled to the PEX pipe 100 at FIG. 5. Because the braid 104 does not substantially increase the thickness of the PEX pipe, standard EVERLOC fittings can be used with PEX pipes made in accordance with the principles of the invention. Further, $PEX_a$ is expandable, which makes it preferred for use with mechanical fittings, but other types of PEX can be used with mechanical fittings in accordance with the principles of the invention. Thus, the braided PEX pipe will not only have more watertight fittings than CPVC pipe, but, due to PEX's flexibility, will have fewer such fittings in tortuous applications.

In an exemplary method of assembly, the braided PEX pipe 100 is cut to length. A compression sleeve 203 made of brass, for example, is slid onto the braided PEX pipe 100. An insert fitting 205 made of brass, for example, is then slid into and attached to an end of the pipe 100. The insert fitting 205 is pressure-fit to the braided PEX pipe 100 by inserting a tool into the bore of the braided PEX pipe 100 that expands the diameter of the braided PEX pipe 100 to engage the insert fitting 205. Thereafter, the compression sleeve 203 is moved over and compressed onto the insert fitting 205. In this manner, a watertight mechanical connection is made that permits the braided PEX pipe 100 to be removedly or fixedly coupled to a component of a fire protection system. The braiding 104 and the use of mechanical fittings 203, 205 provide a PEX pipe that can meet the stringent pressure/temperature requirements of UL 1821, and, thus NFPA 13/13R.

As mentioned above, use of the braided PEX pipe 100 is not limited to fire protection systems, but may be advantageously used in any high pressure and/or high temperature application requiring a short term burst pressure rating of over 1000 psi and/or long term hydrostatic strength of about 175 psi/120° F., but other long term hydrostatic strengths are possible. Because of its flexibility, the braided PEX pipe can be provided in lengths of over 100 feet and may be spooled onto a reel or coiled for storage.

While the invention has been described in terms of exemplary embodiments, those skilled in the art will recognize that the invention can be practiced with modifications in the spirit and scope of the appended claims. The examples given above are merely illustrative and are not meant to be an exhaustive list of all possible designs, embodiments, applications or modifications of the invention.

What is claimed is:

1. A flexible tubing for commercial and residential high pressure and high temperature applications, the flexible tubing comprising:
    an innermost layer formed of cross-linked polyethylene ("PEX"), the innermost layer having a Standard Dimension Ratio (SDR) value of at least about 7.0, the cross-linked polyethylene comprising chemically formed cross-link bonds;
    a reinforcing structure surrounding the innermost layer, the reinforcing structure being coupled to the innermost layer without being embedded in another material; and
    an outer layer disposed about the reinforcing structure,
    wherein the flexible tubing is radially expandable and has a bend radius of at least about 2.5 times an outside diameter.

2. The flexible tubing of claim 1, wherein the flexible tubing has a short term burst rating of at least about 1,000 psi and a long term hydrostatic strength of at least about 175 psi at about 120° F.

3. The flexible tubing of claim 1, further comprising:
    a mechanical fitting fixedly attached to an end of the flexible tubing without the use of glue or solvent to make joints therebetween.

4. The flexible tubing of claim 1, wherein the reinforcing structure is formed with the innermost layer.

5. The flexible tubing of claim 1, wherein the reinforcing structure is at least one of a spiral, helical, woven/interwoven, or loop braid.

6. The flexible tubing of claim 1, wherein the innermost layer has an SDR value between about 7.4 and about 14.0.

7. The flexible tubing of claim 1, further comprising an adhesive disposed between the reinforcing structure and the innermost layer.

8. A flexible tubing, comprising:
    an innermost layer comprising cross-linked polyethylene ("PEX"), the cross-linked polyethylene comprising chemical cross-linking;
    a reinforcing structure surrounding the innermost layer, the reinforcing structure being coupled to the innermost layer without being embedded in another material; and
    an outer layer disposed about the reinforcing structure,
    wherein the flexible tubing is radially expandable and has a bend radius of at least about 2.5 times an outside diameter.

9. The flexible tubing of claim 8, wherein the flexible tubing has a short term burst rating of at least about 1,000 psi and a long term hydrostatic strength of at least about 175 psi at about 120° F.

10. The flexible tubing of claim 8, further comprising:
    a mechanical fitting fixedly attached to an end of the flexible tubing without the use of glue or solvent to make joints therebetween.

11. The flexible tubing of claim 8, wherein the reinforcing structure is formed with the innermost layer.

12. The flexible tubing of claim 8, wherein the reinforcing structure is at least one of a spiral, helical, woven/interwoven, or loop braid.

13. The flexible tubing of claim 8, further comprising an adhesive disposed between the reinforcing structure and the innermost layer.

14. The flexible tubing of claim 8, wherein the flexible tubing meets the National Fire Protection Association's Standard 13 for pipe.

15. The flexible tubing of claim 14, wherein the flexible tubing meets the National Fire Protection Association's Standard 13R for pipe.

16. A dry-pipe sprinkler system including the flexible tubing of claim 14.

17. A flexible tubing for commercial and residential high pressure and high temperature applications, the flexible tubing comprising:
an innermost layer formed of cross-linked polyethylene ("PEX"), the innermost layer having a Standard Dimension Ratio (SDR) value of at least about 7.0, the cross-linked polyethylene comprising chemical cross-linking;
means for reinforcing the innermost layer to provide the flexible tubing with a short term burst rating of at feast about 1000 psi and a long term hydrostatic strength of at least about 175 psi at about 120° F; and
an outer layer disposed about the reinforcing means,
wherein the flexible tubing is radially expandable and has a bend radius of at least about 2.5 times an outside diameter.

18. The flexible tubing of claim 1, wherein the cross-link bonds are produced by a peroxide method or a silane method.

19. The flexible tubing of claim 3, wherein the mechanical fitting is configured to couple with at least one of a plumbing system, a hydronic radiant heating system, and a high pressure and high temperature fire sprinkler system.

20. The flexible tubing of claim 8, wherein the chemical cross-linking is created by a peroxide method or a silane method.

21. The flexible tubing of claim 10, wherein the mechanical fitting is configured to couple with at least one of a plumbing system, a hydronic radiant heating system, and a high pressure and high temperature fire sprinkler system.

22. The flexible tubing of claim 17, wherein the chemical cross-linking is created by a peroxide method or a silane method.

23. The flexible tubing of claim 1, wherein the cross-linked polyethylene comprises at least about 85% cross-linking and carbon-carbon cross-link bonds.

24. The flexible tubing of claim 8, wherein the cross-linked polyethylene comprises at least about 85% cross-linking and carbon-carbon cross-link bonds.

25. The flexible tubing of claim 17, wherein the cross-linked polyethylene comprises at least about 85% cross-linking and carbon-carbon cross-link bonds.

* * * * *